United States Patent
Levy (10) Patent No.: US 9,332,601 B2
(45) Date of Patent: *May 3, 2016

(54) TWO-STAGE AC-DC POWER CONVERTER WITH SELECTABLE DUAL OUTPUT CURRENT

(71) Applicant: General Electric Company, Schenectady, NY (US)

(72) Inventor: Yehuda Daniel Levy, Lod (IL)

(73) Assignee: GENERAL ELECTRIC COMPANY, Schenectady, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/042,810

(22) Filed: Oct. 1, 2013

(65) Prior Publication Data

US 2015/0091458 A1 Apr. 2, 2015

(51) Int. Cl.
    H05B 37/02 (2006.01)
    H05B 33/08 (2006.01)
    H02M 1/42 (2007.01)
    H02M 3/28 (2006.01)

(52) U.S. Cl.
    CPC ......... H05B 33/0815 (2013.01); H02M 1/4258 (2013.01); H02M 3/28 (2013.01); Y02B 70/126 (2013.01)

(58) Field of Classification Search
    CPC .... H05B 37/02; H05B 33/08; H05B 33/0815; H05B 33/0806; H05B 33/0845; H02M 1/12; H02M 1/4225; H02M 1/4258; H02M 3/28; H02M 3/33507; H02M 2001/0025; H02M 2001/007
    USPC .......... 315/200 R, 209 R, 224, 225, 291, 307, 315/308
    See application file for complete search history.

(56) References Cited

U.S. PATENT DOCUMENTS

| | | | |
|---|---|---|---|
| 5,371,443 A | 12/1994 | Sun et al. | |
| 6,177,645 B1 | 1/2001 | Church et al. | |
| 6,556,462 B1 | 4/2003 | Steigerwald et al. | |
| 7,157,886 B2 | 1/2007 | Agarwal et al. | |
| 8,169,796 B2 | 5/2012 | Hosotani | |
| 8,213,193 B2 | 7/2012 | Ye | |
| 8,222,832 B2* | 7/2012 | Zheng | H05B 33/0815 315/211 |

(Continued)

OTHER PUBLICATIONS

U.S. Appl. No. 14/042,786, filed Oct. 1, 2013.*
"Power Factor Correlation Using the Buck Topology—Efficiency Benefits and Practical Design Considerations", Texas Instruments Power Supply Design Seminar, pp. 1-37 (2010).
U.S. Appl. No. 14/042,796, filed Oct. 1, 2013, Yehuda Levy.
U.S. Appl. No. 14/042,786, filed Oct. 1, 2013, Yehuda Levy.
U.S. Appl. No. 14/042,791, filed Oct. 1, 2013, Yehuda Levy.
U.S. Appl. No. 14/042,814, filed Oct. 1, 2013, Yehuda Levy.
U.S. Appl. No. 14/042,794, filed Oct. 1, 2013, Yehuda Levy.
U.S. Appl. No. 14/042,802, filed Oct. 1, 2013, Yehuda Levy.

(Continued)

*Primary Examiner* — Jimmy Vu
(74) *Attorney, Agent, or Firm* — GE Global Patent Operation; Peter T. DiMauro (57) ABSTRACT

A two-stage AC-DC power converter for powering a load at a substantially constant current, and related methods and systems. The first stage of the AC-DC power converter includes a conventional power factor correction (PFC) circuit that outputs a direct current (DC) voltage and a DC current. The second stage of the AC-DC power converter includes a low voltage flyback circuit that receives the DC voltage and the DC current. The low voltage flyback circuit includes a flyback transformer and a switch circuit that selectably toggles the substantially constant output current provided by the low voltage flyback circuit to the load between a first and a second, preset constant current. The secondary windings of the flyback transformer are split into two sections, and the switch circuit toggles the two sections of the secondary windings between a series and a parallel configuration to provide the first and second, preset constant currents.

20 Claims, 10 Drawing Sheets

(56) References Cited

U.S. PATENT DOCUMENTS

| | | |
|---|---|---|
| 8,441,201 B2 | 5/2013 | Aso |
| 8,471,488 B1 | 6/2013 | Hopkins et al. |
| 8,779,676 B2 | 7/2014 | Simi |
| 8,848,321 B2 | 9/2014 | Halberstadt |
| 8,942,012 B2 | 1/2015 | Louvel |
| 8,957,600 B1 | 2/2015 | Levy |
| 2007/0008745 A1 | 1/2007 | Joshi et al. |
| 2008/0246444 A1 | 10/2008 | Shao et al. |
| 2008/0278092 A1 | 11/2008 | Lys et al. |
| 2010/0020579 A1 | 1/2010 | Melanson |
| 2010/0052568 A1 | 3/2010 | Cohen |
| 2010/0242630 A1 | 9/2010 | Al-Qassem |
| 2010/0246230 A1 | 9/2010 | Porter et al. |
| 2010/0308733 A1 | 12/2010 | Shao |
| 2011/0216560 A1 | 9/2011 | Ye |
| 2011/0292704 A1 | 12/2011 | Makino et al. |
| 2013/0044521 A1 | 2/2013 | Zhao et al. |
| 2013/0134894 A1 | 5/2013 | Kuang |
| 2014/0003105 A1 | 1/2014 | Lin et al. |
| 2014/0159693 A1 | 6/2014 | Kuang et al. |
| 2014/0292229 A1 | 10/2014 | Chiu et al. |

OTHER PUBLICATIONS

US Notice Of Allowance issued in connection with related U.S. Appl. No. 14/042,796 on Oct. 10, 2014.

US Non-Final Office Action issued in connection with related U.S. Appl. No. 14/042,791 on Dec. 4, 2014.

US Non-Final Office Action issued in connection with related U.S. Appl. No. 14/042,794 on Dec. 4, 2014.

US Non-Final Office Action issued in connection with related U.S. Appl. No. 14/042,802 on Apr. 10, 2015.

US Final Office Action issued in connection with related U.S. Appl. No. 14/042,791 on Apr. 22, 2015.

US Final Office Action issued in connection with related U.S. Appl. No. 14/042,794 on Apr. 24, 2015.

US Non-Final Office Action issued in connection with related U.S. Appl. No. 14/042,814 on Jun. 12, 2015.

US Non-Final Office Action issued in connection with related U.S. Appl. No. 14/042,802 on Oct. 23, 2015.

US Final Office Action issued in connection with related U.S. Appl. No. 14/042,814 on Dec. 4, 2015.

* cited by examiner

FIG. 1
(Conventional)

FIG. 7
(Conventional)

TWO-STAGE AC-DC POWER CONVERTER WITH SELECTABLE DUAL OUTPUT CURRENT

FIELD OF THE INVENTION

The present invention relates generally to power supplies and, more particularly, to a high-efficiency, two-stage AC-DC power converter having a second stage low voltage flyback circuit that selectably switches the output current provided to its load between a first and a second, preset constant current.

BACKGROUND OF THE INVENTION

Power converters are used in a variety of portable electronic devices, including laptops, mobile devices, cellular phones, electronic digital pads, video cameras, digitals cameras, and the like. In addition, power converters may be used in non-portable applications, such as liquid-crystal display (LCD) backlighting, automotive lighting, and other general purpose or specialty lighting.

Power converters come in many forms. Some converters are DC-DC converters, which convert a Direct Current (DC) input voltage to a different DC output voltage. AC-AC converters convert one Alternating Current (AC) input voltage to a different AC output voltage. DC-AC converters convert a DC input voltage to an AC output voltage, and AC-DC converters convert an AC input voltage to a DC output voltage.

Conventional AC-DC power converters typically include a diode bridge rectifier stage (i.e., a bridge or full-wave rectifier) and a bulk storage capacitor. The incoming AC voltage is generally provided by an AC power supply or AC line, which is converted to a DC output voltage when run through the diode bridge rectifier and bulk storage capacitor. This DC voltage is typically further processed by a converter, which generates an output signal that is applied across a load.

In this configuration, the rectifying circuit only draws power from the AC line when the instantaneous AC voltage is greater than the voltage across the bulk storage capacitor, resulting in a non-sinusoidal current signal that has high harmonic frequencies. A drawback with this configuration is that the power factor or ratio of real power to apparent power is usually very low. Thus, the converter draws excess current but fails to use the excess current to perform or accomplish any circuit functions.

To address the power factor issue, it is common to couple a power factor correction (PFC) stage to the diode bridge rectifier, which improves the use of current drawn from the main AC line by shaping it to be more sinusoidal. Generally, power converters that include PFC stages are either double-stage or single-stage power converters.

A converter having a double-stage PFC architecture allows for optimization of each individual power stage. However, this type of two-stage architecture uses many components and processes the power twice.

A converter having a single-stage PFC architecture uses fewer components and processes the power one time, which can improve efficiency and can be more reliable than a double-stage PFC architecture. But, a major drawback with the single-stage architecture is that it has a large output current ripple, which is at twice the AC line frequency. The magnitude of this ripple can overdrive conventional feedback networks—forcing them outside of their linear response region or degrading their ability to maintain a high power factor.

One technique for smoothing out or decreasing the large output current ripple is to couple a filtering capacitor, having a large capacitance value, to the output filter network. However, although a filtering capacitor having a large capacitance value smoothes out the large output current ripple delivered to the load without interfering with the control loop, such a filtering capacitor is usually an electrolytic capacitor that tends to be large and expensive and tends to degrade circuit reliability.

In addition, the large capacitance of such a filtering capacitor slows the response time of the control loop—resulting in excessive current, which can overdrive, and potentially damage, the load. The excessive currents typically occur when the load is connected to a pre-powered converter (e.g., "hot plug", "hot insertion"). The output capacitor at this point is fully charge to the maximal output voltage; thus, the energy stored in it can damage the load right at the connection of it to the converter.

As a solid state light source, LEDs are being used more and more frequently due to their superior longevity, low-maintenance requirements, and continuously-improving luminance. In low-power lighting applications, the cost of LED drivers that are used to power LED loads is a critical design consideration. Such costs, however, must also be weighed against the necessary performance criteria of LED drivers, which must not only be efficient but also generate minimal ripples in the output current provided to the LED load. Large current ripples reduce the reliability, longevity, and luminance output of the LEDs, which is obviously not desirable.

Although there are numerous LED driver designs that use either two-stage power converters or single-stage power converters, one common type of LED driver is a two-stage PFC converter that includes an active PFC stage followed by a DC-DC converter stage. The active PFC stage provides a near unity power factor and a low total harmonic distortion (THD) across the entire universal input voltage range, while the DC-DC stage is used to provide tight regulation and control on the current output provided to the LED load. The DC-DC converter stage may also be referred to as a downstream isolation and regulator circuit, since it is configured to receive the DC voltage and the DC current output by the active PFC stage and then to provide a substantially constant current to the load (or LED load).

The active PFC stage is typically accomplished with a boost power topology. A drawback of such conventional designs, however, is the fact that these two stages require two independently controlled power switches and two control circuits (or "controllers"). The two-stage design suffers from an increased component count and a higher-than-desired cost.

Although it would be cheaper to employ a passive PFC as the first stage, such topology architectures usually cannot provide the necessary efficiency required by energy regulations or minimal current ripples required by the LED load. Another drawback to such two stage LED driver designs is that each LED driver is typically configured for one specific output current level. For each application requiring a different output current, a different LED driver is typically necessary.

For these reasons, there is a need for an LED driver that uses an active PFC stage, while still achieving necessary efficiency and minimizing output current ripples required by the LED load.

There is a need in the industry to be able to use a buck (step-down) topology, as the active PFC stage, that functions in transition mode (also referred to as boundary conduction mode or critical conduction mode operation), using one of the many low cost control chips, or integrated circuits (ICs), that are typically only designed to be used with either flyback or boost topologies. However, such low cost ICs generally do not work well with buck topologies because they do not provide good THD results (i.e., they often draw more than desired —or required by law or regulation—power from the AC power supply).

Although there are some active and expensive control chips or ICs that have been developed specifically for use with buck topologies to improve their THD results, there remains a need in the industry for enabling buck topologies to be used with the above-mentioned, lower-cost control chips or ICs, while still being able to achieve good THD results. Further, there is a need in the industry for a single LED driver that can provide at least two different output currents, preferably switchable by the user, so that such single LED driver can be used with a wider range of LED load applications.

SUMMARY OF EMBODIMENTS OF THE INVENTION

Given the aforementioned deficiencies, a need exists for systems, methods, and devices providing a low cost and efficient LED driver. Particularly, what are needed are systems, methods, and devices that enable an active buck topology, functioning in transition mode, to be used as a first PFC stage of an LED driver whereby the buck topology is designed in such a manner that it can be controlled with a low cost control chip that is typically only used with boost or flyback topologies, while still achieving good THD results. Further, what are needed are systems, methods, and devices that enable a flyback current circuit to be used as a second stage of an LED driver, whereby the flyback circuit includes a switch or jumper setting selectable by the user that enables the LED driver to be toggled or switched between two different output currents—depending upon the requirements of the LED load being powered by the LED driver.

Embodiments of the present invention provide a light emitting diode (LED) driver for powering an LED load at a constant or substantially constant current. The LED driver includes a buck topology power factor correction (PFC) circuit having a low cost PFC controller, the buck PFC circuit configured to draw an AC input current having an original total harmonic distortion (THD) and further configured to sense a rectified input voltage from a full-wave rectifier. The LED driver also includes a low voltage flyback circuit configured to receive the DC voltage and DC current output by the buck PFC circuit. A passive voltage multiplier circuit is configured to multiply the sensed rectified input voltage provided to the PFC controller by a value on N, where N is a whole number greater than 1, which causes the AC input current drawn by the buck PFC to circuit to have an improved second, lower THD better than the original THD.

In some embodiments, an improved second stage of an LED driver includes a low voltage flyback circuit. By splitting the secondary windings of the flyback transformer used in the low voltage flyback circuit into two sections and by adding a switch circuit between the two sections, it is possible to toggle the DC output current provided by the low voltage flyback circuit to the LED load between two different values.

In yet further embodiments, although the improved buck PFC circuit, the passive voltage multiplier circuit, and the dual-output low voltage flyback circuit are designed and explained in conjunction with their use as components usable in an LED driver, it will be appreciated by those of skill in the art that each independent circuit design and teaching has broad utility and can be used as components in a wide range of power supplies, power converters, driver circuits, and for providing power to a wide variety of loads, other than just LED loads.

As an example of one of the above embodiments of the invention, the passive voltage multiplier circuit is preferably configured a Zener resistor multiplier arrangement that can be made to approximate any polynomial function, not just a squaring function, such as $X^n$ where "n" can be any real number. This arrangement can be added to existing designs of PFC converters (other than just buck PFC converters), such as flyback PFC converters, and can improve the THD results associated with such PFC converters, which reduces the current that must be drawn from the AC power supply. This multiplier circuit is typically configured to be connected to the input voltage sensing pin of the control chip of the PFC converter.

Yet further, it will be appreciated by those of skill in the art that the improvements described herein can be used to advantage not only in two-stage LED drivers or other types of power supplies but also in single-stage LED driver and other power supply designs, as will be apparent based on the teachings contained herein.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form part of the specification, illustrate the present invention and, together with the description, further serve to explain the principles of the invention and to enable a person skilled in the relevant art(s) to make and use the invention.

DETAILED DESCRIPTION OF EMBODIMENTS OF THE INVENTION

While the present invention is described herein with illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Figure 1:
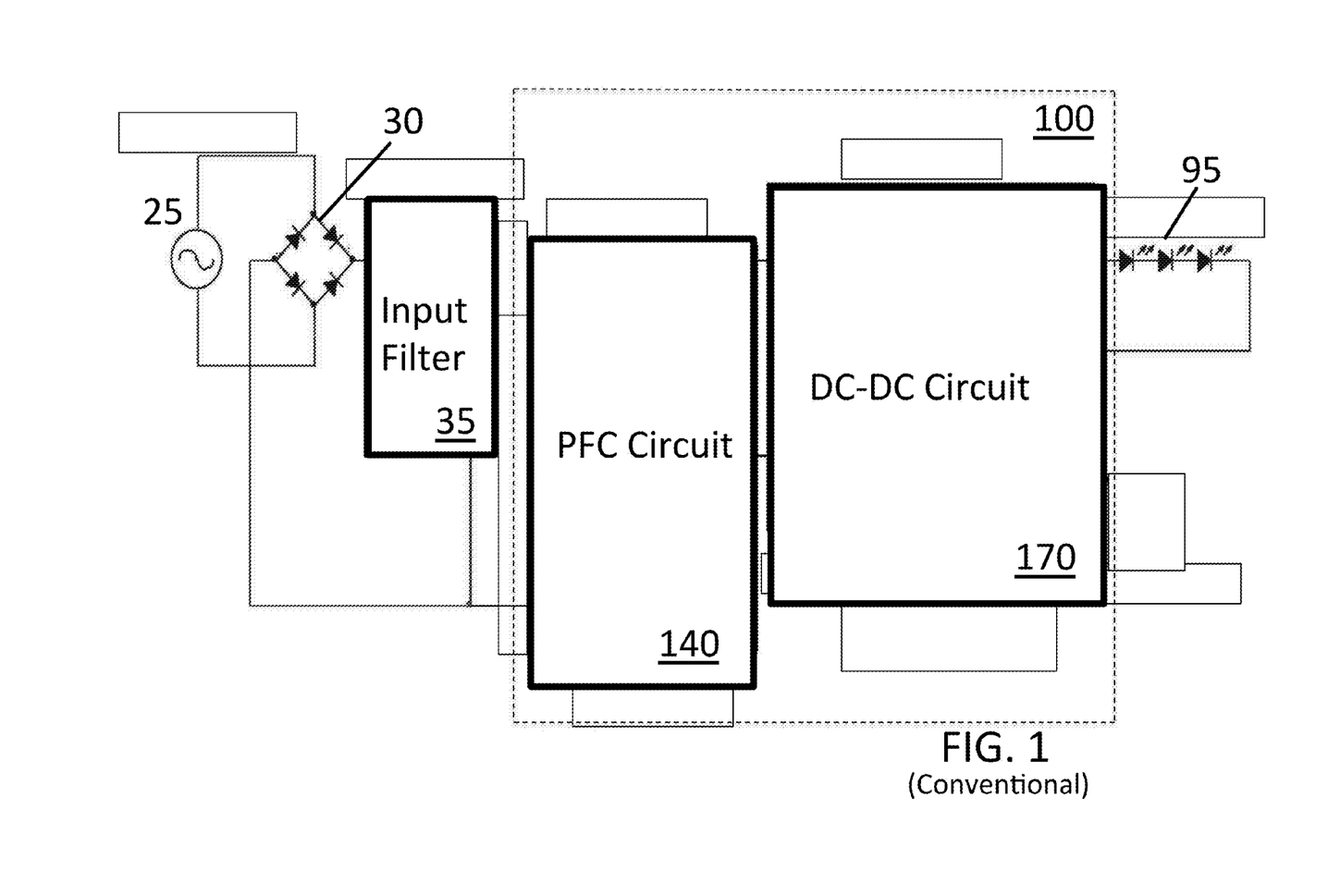
FIG. 1 illustrates a conventional two-stage LED driver in block diagram format.

FIG. 1 illustrates a conventional two-stage LED driver 100 in block diagram format. The conventional LED driver 100 is connected between an AC power supply 25 and a load 95, which, in this application, is one or more LEDs (hereinafter referred to either as "the load" or as "the LED load").

The AC voltage and current from the AC power supply 25 runs first through a bridge or full-wave rectifier 30 and a high frequency input filter 35, which filters out the high frequency components generated by the PFC circuit 140 and prevents such high frequency noise from being injected back into the bridge rectifier 30. Although shown as part of the LED driver 100, in some embodiments the bridge rectifier 30 and input filter 35 are separate components through which the AC power is supplied before reaching the main components of the two-stage LED driver 100.

The first stage of the conventional two-stage LED driver 100 is a PFC circuit 140. The PFC circuit 140 is conventionally an active PFC, such as a flyback converter in discontinuous conduction mode (DCM), a flyback converter in transition or critical conduction mode (CrCM), a boost converter in continuous conduction mode (CCM), a boost converter in DCM, or a boost converter in transition or CrCM.

The conventional PFC circuit 140 provides a near unity power factor (PF) and a low THD across the entire input voltage range from the AC power supply 25. The second stage of the conventional two-stage LED driver 100 is a DC-DC circuit 170, which may also be referred to as a downstream isolation and regulator circuit, since it is configured to receive the DC voltage and the DC current output by the active PFC circuit and then to provide tight regulation or control over the output current (e.g., a substantially constant current) provided by the LED driver 100 to the LED load 95.

Figure 2:
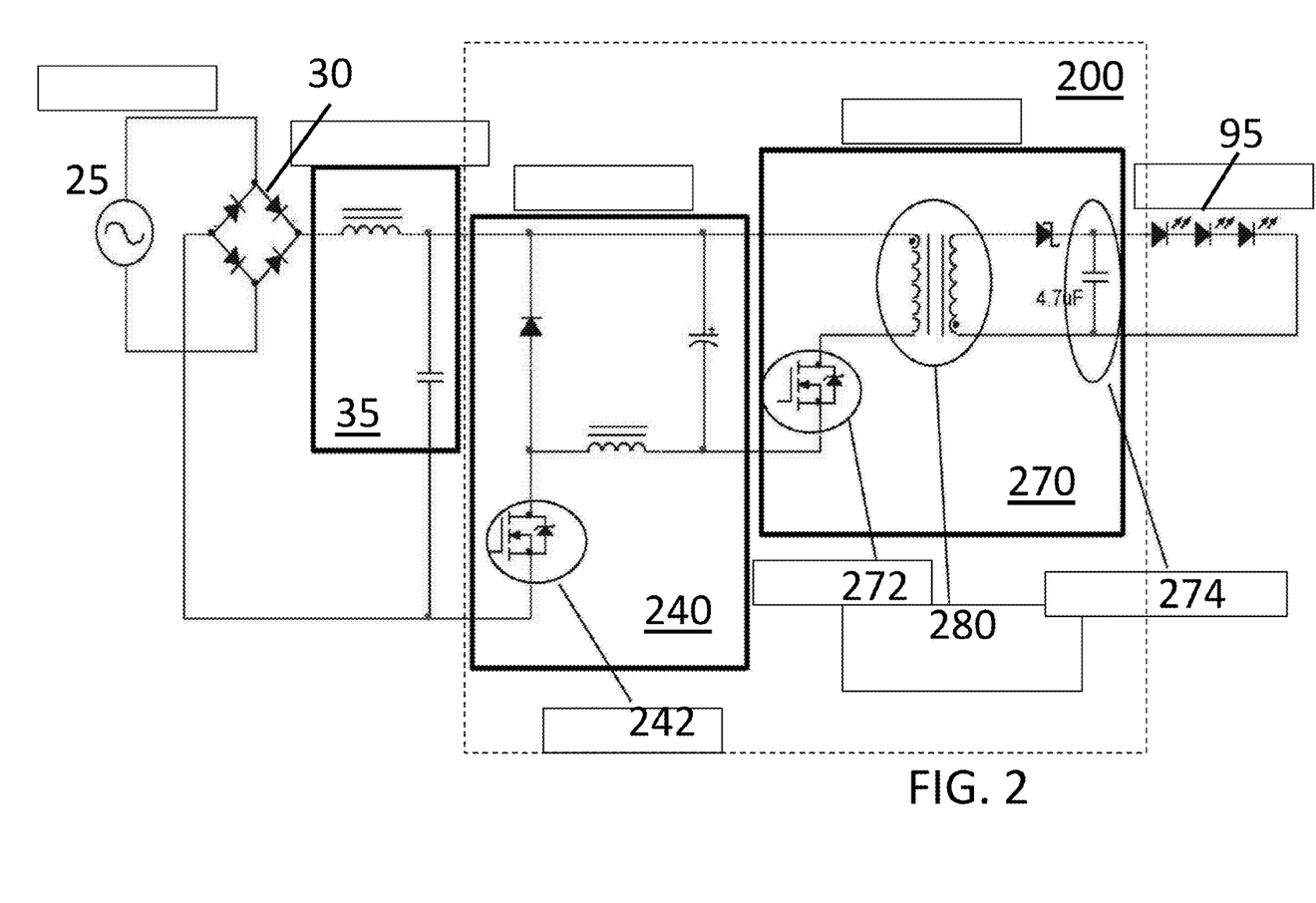
FIG. 2 is a simplified schematic diagram of an improved LED driver in accordance with embodiments of the present invention.

In embodiments of the invention, FIG. 2 illustrates a simplified schematic of an improved LED driver 200 according to the teachings disclosed herein. The improved LED driver 200 is connected between the AC power supply 25 and the LED load 95.

As with the conventional LED driver 100 from FIG. 1, the AC voltage and current from the AC power supply 25 runs first through the bridge rectifier 30 and the high frequency input filter 35. As with the conventional LED driver 100 from FIG. 1, in some embodiments the bridge rectifier 30 and input filter 35 may be part of the front end (or first stage) of the improved LED driver 200 or they may be separate components through which the AC power is supplied before reaching the main components of the improved LED driver 200.

The improved LED driver 200 preferably includes a buck topology PFC circuit 240. Preferably, the buck topology PFC circuit 240 is an active PFC; preferably configured as a buck converter operating in transition mode or CrCM. A second, follow-up stage of the improved LED driver 200 is a downstream isolation and regulator circuit, preferably in the form of a low voltage flyback converter 270 configured to provide a constant or substantially constant output current, at a desired amperage (such as 350 mA or 700 mA, for example), to the LED load 95.

The buck topology PFC circuit 240 preferably includes a low-cost switch 242, such as a 500 volt, 1.6 ohm MOSFET. As will be discussed in greater detail hereinafter, the buck topology PFC circuit 240 preferably also includes a low cost current-mode PFC controller operating in transition mode, such as an L6561 or L6562, either of which are available from STMicroelectronics, which is headquartered in Geneva, Switzerland and accessible on the Internet at http://www.st.com.

Alternatively, instead of an L6561 or L6562 controller, the buck topology PFC circuit 240 could also use a UCC28810 controller, which is effectively comparable to either the L6561 or L6562 controller, and which is available from Texas Instruments Incorporated, headquartered in Dallas, Tex., USA and accessible on the Internet at http://www.ti.com.

Although not listed herein, it will be appreciated by those of skill in the art that there are many other, low-cost, current-mode PFC controllers, in addition to the L6561 or L6562 controller or the UCC28810 controller, that are comparable and could be used in place of the L6561 or L6562 controller or the UCC28810 controller described herein.

The buck topology PFC circuit 240 provides superior efficiency—maintaining a 96% or better efficiency at full-load (e.g., at a 95 W load) for AC line input voltages ranging between 90-270 VAC and with the output voltage maintained at 80 VDC; and maintain a 95% or better efficiency with an AC line input voltage of 115 VAC at less-than full loads ranging between 30 W and 90 W and with the output voltage maintained at 80 VDC.

A disadvantage of a buck topology PFC circuit 240, as compared to a boost converter, is that using one of the low cost controllers described above results in poor THD results. Poor THD in the AC input current drawn by the LED driver 200 causes the LED driver 200 to draw excessive power and current from the AC power supply 25.

Although there are active PFC controllers, offered by several different manufacturers, that are specifically designed to improve the THD of the AC input current drawn by the buck topology PFC circuit 240, such controllers are much more expensive (e.g., on the order of 3-4 times more expensive per controller) when compared to the low cost controllers, described above, that are traditionally designed for use with boost or flyback PFC circuits.

Since cost is a critical factor in the design of any LED driver, it was desirable to find a low cost solution to improve the THD of the input AC current drawn by the buck topology PFC circuit 240 while still using one of the low cost controllers that are not internally configured to improve the THD of the input AC current when used with a buck PFC converter.

According to their design specifications, the input peak current of a buck topology PFC circuit 240 is defined by the equation $<Ig> = \frac{1}{2} \cdot Ip \cdot Vo/Vg$ where Ip is the programmed input current provided by the low cost controller, such as the ST6562 chip, where Vo is the output voltage and Vg is the input voltage to this stage. Further, the input peak current from the low cost controller is defined by the equation $Ip(t)=K*Vg(t)$.

Figure 3:
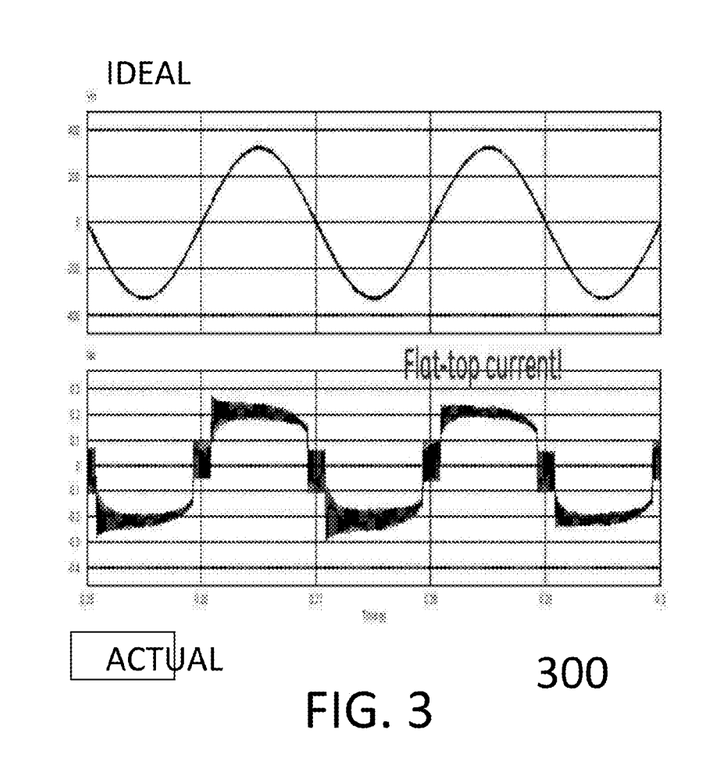
FIG. 3 illustrates two graphs, the top graph illustrating an ideal current provided by an AC power supply, the lower graph illustrating the actual output current drawn by a conventional buck topology PFC circuit when used with a low cost PFC controller with conventional sensed input voltage provided to the PFC controller.

Thus, when a low cost controller, such as the L6562 chip, is used with the typical buck topology PFC circuit 240, the input peak current of the typical buck topology PFC circuit 240 is defined as $<Ig>=\frac{1}{2}K*Vo$, which generates a flat top current 300, as shown in the lower graph of FIG. 3. However, it was determined that if the sensed input voltage Vg was squared (or otherwise multiplied by a factor of N, where N is a whole number equal to or greater than 2) as provided to the sensed input voltage pin of the low cost controller, such as the L6562 chip, then the input peak current from the low cost controller could be re-defined by the equation $Ip(t)=K*Vg^2(t)$. If that modification were made to the sensed voltage input into the low cost controller, then the average input current of the typical buck topology PFC circuit 240 can be re-defined as $<Ig>=\frac{1}{2}K*Vg*Vo$ or a constant $C*Vg$, such that $<Ig>$ follows Vg, which indicates a unity (or near unity) power factor.

Figure 4:
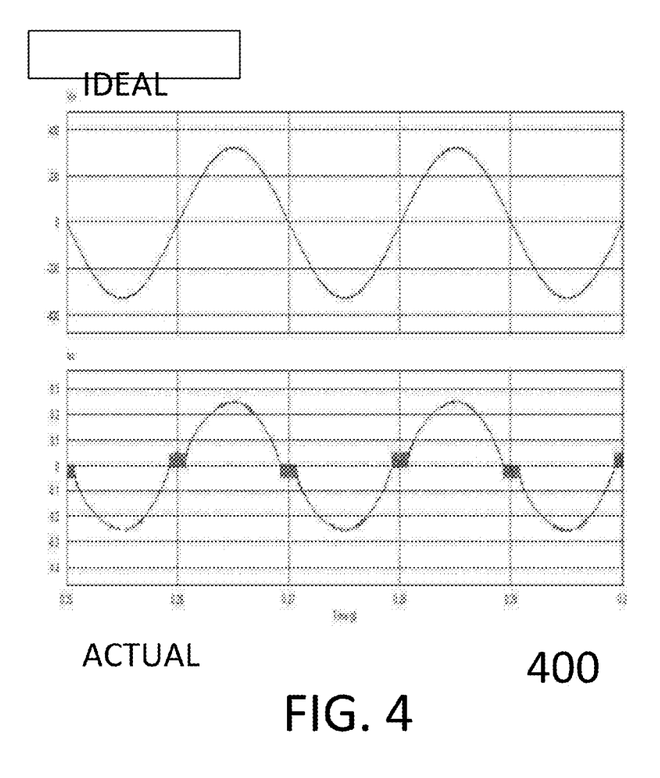
FIG. 4 illustrates two graphs, the top graph illustrating an ideal current provided by an AC power supply, the lower graph illustrating the actual output current drawn by a conventional buck topology PFC circuit when used with a low cost PFC controller, but for which the sensed input voltage provided to the PFC controller is multiplied using a passive multiplier circuit in accordance with embodiments of the present invention.

Merely squaring the sensed Vg input into the low cost controller improves the input AC current drawn by the improved buck topology PFC circuit 240, which then draws a nearly sinusoidal input AC current 400, as shown in the lower graph of FIG. 4. Whereas the typical THD of the AC input current drawn by a buck topology PFC circuit 240, using one of the low cost controllers, would generally result in a 40-50% distortion range (again, as shown by the lower graph of FIG. 3), it has been found that by squaring (or further multiplying) the sensed input voltage provided to the low cost controller, even when used with the buck topology PFC circuit 240, results in a THD of between 10% and 14% at an input voltage ranging between 230 VAC and 115 VAC, where the output voltage for the 230 VAC input was maintained at approximately 80 VDC and where the output voltage for the 115 VAC input was maintained at approximately 40 VDC.

Figure 5:
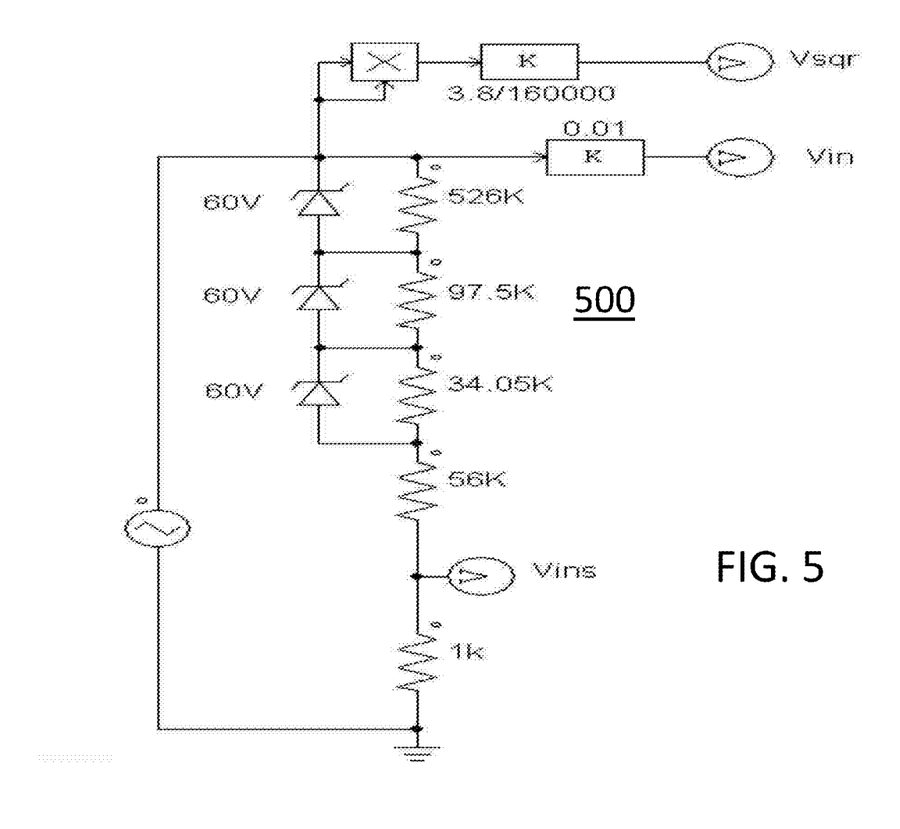
FIG. 5 illustrates an exemplary, passive voltage multiplier circuit used with the improved buck topology PFC circuit constructed in accordance with embodiments of the present invention.

FIG. 5 illustrates an exemplary, low cost, passive circuit 500 for squaring the sensed input voltage Vg provided as an input to one of the low cost controllers, such as the L6562 chip. Preferably, the exemplary voltage squarer circuit 500 is positioned between the full-wave rectifier and the sensed voltage input (or input pin) of the PFC controller. The exemplary voltage squarer circuit 500 is preferably implemented as a Zener diode ladder.

The Zener diode ladder uses several lines to linearize the squared-voltage function. For example, when the sensed voltage (Vin) is low, none of the Zener diodes conduct and the resistors determine the lowest slope of Vo/Vin. However, as Vin increases, the first Zener diode conducts and imposes a constant current on its parallel resistor. Thus, the slope of Vo/Vin becomes steeper.

As Vin further increases, other Zener diodes begin to conduct current and the Vo/Vin slope becomes steeper. In this manner, the squared voltage curve is approximated. Although not necessary, additional steps of Zener diodes and parallel resistors may be added to the Zener diode ladder to improve the accuracy of the Vo/Vin slope. Advantageously, this passive solution for squaring the sensed input voltage provided to the PFC controller is relatively cost effective since it does not require any integrated circuits, which would increase the cost of the LED driver 200. In other words, this passive voltage squaring solution enables the buck topology PFC circuit 240 to be implemented with the lower cost controllers, as described above, and without the need to use a more expensive controller (such as an IC) that has been designed specifically to improve the THD of the AC current drawn by the buck topology PFC circuit 240.

It will be appreciated by those of skill in the art that this passive Zener arrangement can be made to approximate any polynomial function (not just a squaring function), such as $K*X^n$, where "n" can be any real number greater than 1 and K is a constant smaller than 1. This arrangement can be added to existing designs of other PFC converters, such as a flyback PFC converter, and can improve the input AC current drawn by such flyback PFC converters and the THD results for such flyback PFC converters. Preferably, this voltage multiplier circuit arrangement is configured to receive the rectified input voltage from the full-wave rectifier and then to provide the modified (e.g., squared, cubed, etc.) rectified input voltage to the input voltage sensing pin of the PFC control chip, or PFC controller, used with the flyback PFC converter.

Turning back to FIG. 2, the low-voltage, second stage flyback converter 270 preferably includes a low-cost switch 272, such as a 150-200 volt, 0.4 ohm MOSFET. The low voltage flyback converter 270 also includes a flyback transformer 280, in one embodiment being a 1:1 low leakage, high efficiency transformer. Additionally, the low voltage, second stage flyback converter 270 only needs to use a low cost, small capacitor 274, on the order of just 4.7 uF, by way of example. This is smaller, in orders of magnitude, compared to capacitors that are typically required by single-stage PFC designs (such as is required in the circuits described hereinafter and illustrated in FIGS. 7, 10 and 11).

Preferably, the output voltage from the buck topology PFC circuit 240 is designed to be between 40-80 VDC, which is the input DC voltage supplied to the low voltage flyback converter 270. In one embodiment, the low voltage flyback converter 270 is, thus, designed to provide a constant or substantially constant current to the LED load 95 of 350 mA or 700 mA, as desired based on the requirements and specifications of the LED load 95 used in any particular application.

As will be appreciated by those of skill in the art, the exact output current can be configured, in advance, based on the winding ratios of the flyback transformer 280 and other design selections of other conventional components within the low voltage flyback converter 270.

Advantageously, by squaring the sensed voltage input into the low cost controller of the buck topology PFC circuit 240, the improved two-stage LED driver 200 is not only efficient, but draws an input AC current with good THD across a wide range of input AC voltages. In addition, the same or similar low cost controllers can be used for both stages 240, 270 of the two-stage LED driver 200.

Yet further, low cost MOSFET switches 242, 272 can be used with each stage 240, 270, respectively, of the two-stage LED driver 200, and with the two-stage design, there is no need for a high capacitance, more expensive load capacitor to minimize or filter the ripples of the output current provided to the LED load 95.

In another embodiment, modifications can be made to the low voltage flyback converter 270 to enable one LED driver to be able to switch or toggle between two desired output currents provided to the LED load 95.

Figure 6:
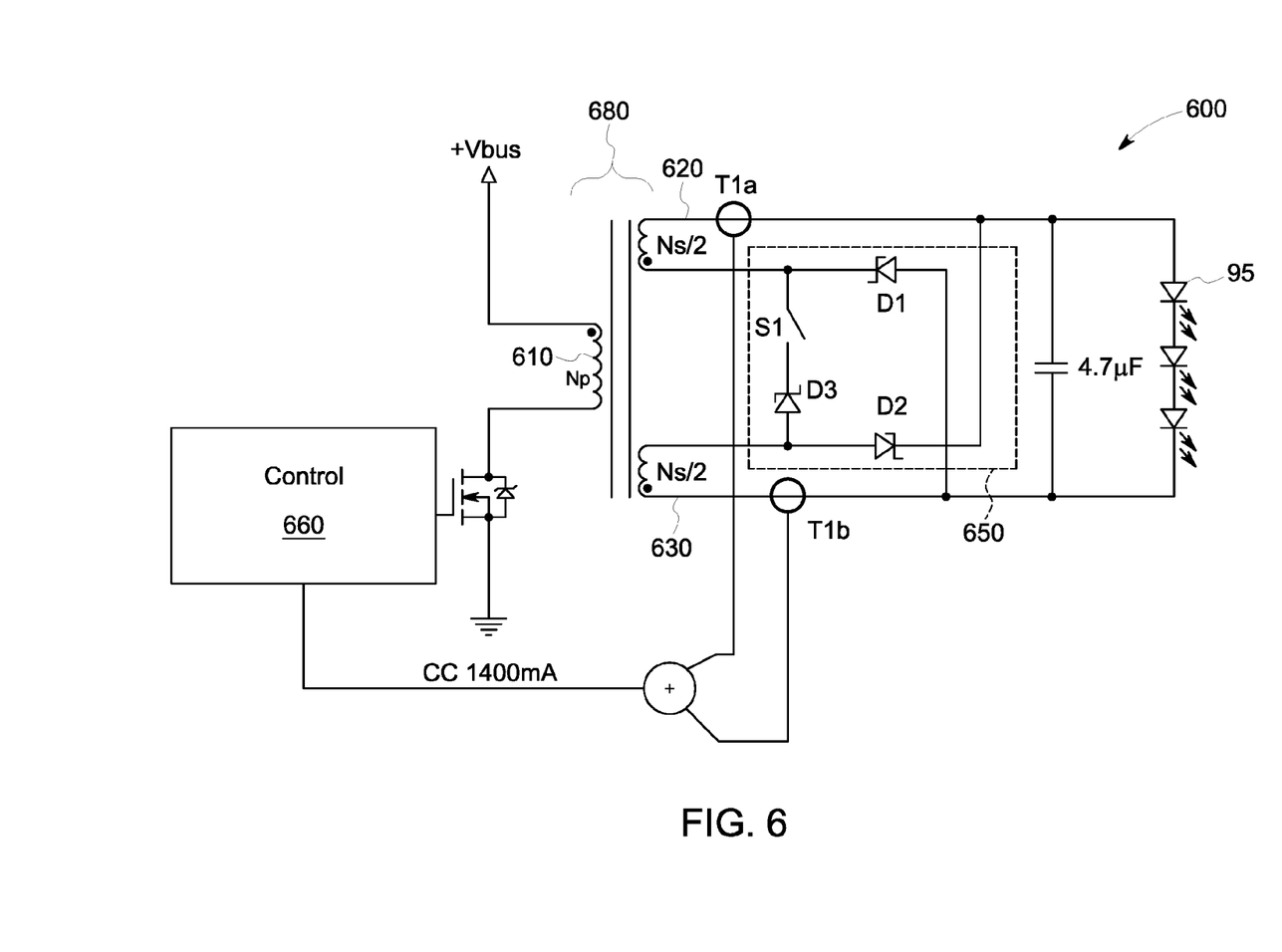
FIG. 6 is a schematic of an improved low-voltage flyback converter constructed in accordance with embodiments of the present invention.

Turning now to FIG. 6, a schematic of a dual-current, low voltage flyback converter 600 is illustrated. This low voltage flyback converter 600 may, but does not have to be, used in conjunction with the buck topology PFC circuit 240, described above, as an alternative stage two component of improved two-stage LED driver 200 from FIG. 2.

As shown in FIG. 6, the flyback transformer 680 is configured such that its primary windings 610 are designed in conventional fashion; however, the secondary windings 620, 630 are preferably split into two identical halves (bifilar windings). A switch circuit 650, which includes a switch Si and three fast Schottky diodes D1, D2, and D3, is placed across the output of the flyback transformer 680, such that the secondary windings 620, 630 are configured either to be in series or in parallel with each other—based on the position and status of the switch circuit 650.

More specifically, when the switch S1 is closed, the fast Schottky diodes D1, D2 are in their OFF state, but the fast Schottky diode D3 is in its ON state, which causes the secondary windings 620, 630 to be in a series configuration. Conversely, when the switch S1 is open, the fast Schottky diodes D1, D2 are in their ON state, and the fast Schottky diode D3 is in its OFF state, which causes the secondary windings 620, 630 to be in a parallel configuration.

Thus, when the secondary windings 620, 630 are in series, the output voltage from the low voltage of flyback converter 270 will be twice and the amperage of the current will be "I" across the load 95. When the secondary windings 620, 630 are in parallel, the output voltage of the low voltage of flyback converter 270 will be half, but amperage of the current across the load 95 will be doubled, in other words, two times "I" (i.e., 2×I, 2*I, or 2I).

Thus, by way of example only, if current "I" is set to 700 mA, such current is provided as an output of the low voltage of flyback converter 270 to the LED load 95 when the switch circuit 650 is closed. However, when the switch circuit 650 is opened, the current provided as an output of the low voltage of flyback converter 270 to the LED load 95 is equal to 2*I, or 1400 mA, in this example.

Typically, an LED driver is configured to deliver one specific output current. The above circuit design, however, enables a single LED driver to be switchable or to be set to one of two different output currents. Such a design is efficient, saves space, and improves logistics because one SKU LED driver may be used for two different output current requirements.

In addition, no modifications need to be made to the controller 660 to achieve the desired output current. As will be appreciated by those of skill in the art, the specific output current "I" (and 2*I) can be determined, in advance, by the circuit designer based on the winding ratios between the primary windings 610 and the secondary windings 620, 630 of the flyback transformer 680 and other design selections of other conventional components within the low voltage flyback converter 600.

Figure 7:
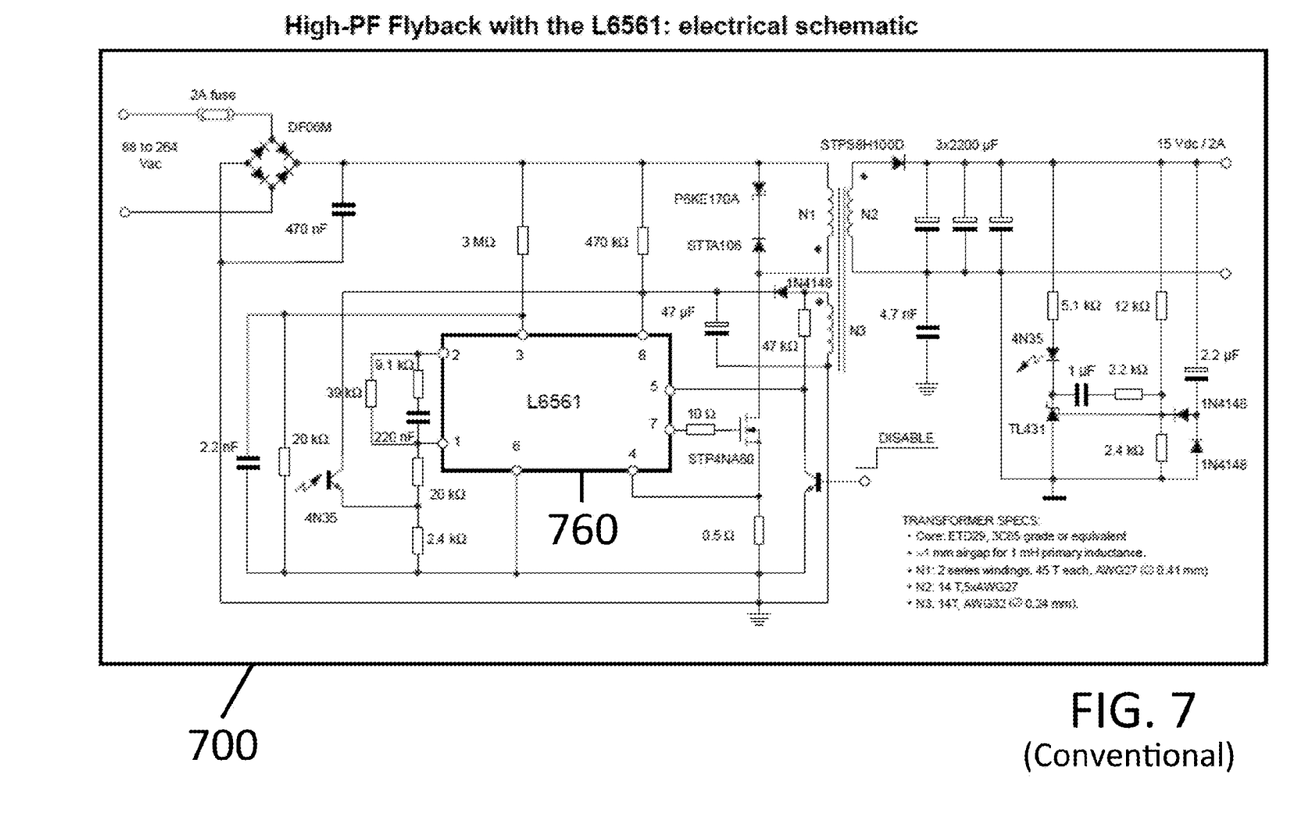
FIG. 7 illustrates an electrical schematic of a conventional, high power flyback, single-stage LED driver.

In another embodiment, it is possible (i) to improve the THD or (ii) to provide for a switchable output current or (iii) to combine both improvements in a single stage flyback converter or single stage flyback LED driver. A conventional single stage flyback LED driver 700 is illustrated in FIG. 7. The conventional single stage flyback LED driver 700 has a high power factor and uses a conventional PFC controller 760, such as the L6561 (or an L6562 or a UCC28810). Most flyback PFC in transition mode use conventional controllers to sense the rectified line voltage (Vin). Typically, this is accomplished by using a simple resistor divider, such that Vsense=K*Vin where K<<1.

In this operation mode, the THD is not zero and the average input current does not precisely follow the input voltage. In other words, the current signal is not sinusoidal, but has a flattened peak waveform. The amount of this flatness is determined by $K_v$, meaning—the current signal is impacted by the input voltage magnitude with respect to the output voltage of the converter and the turns ratio of the main Flyback transformer ($n=N_2/N_1$).

Figure 8:
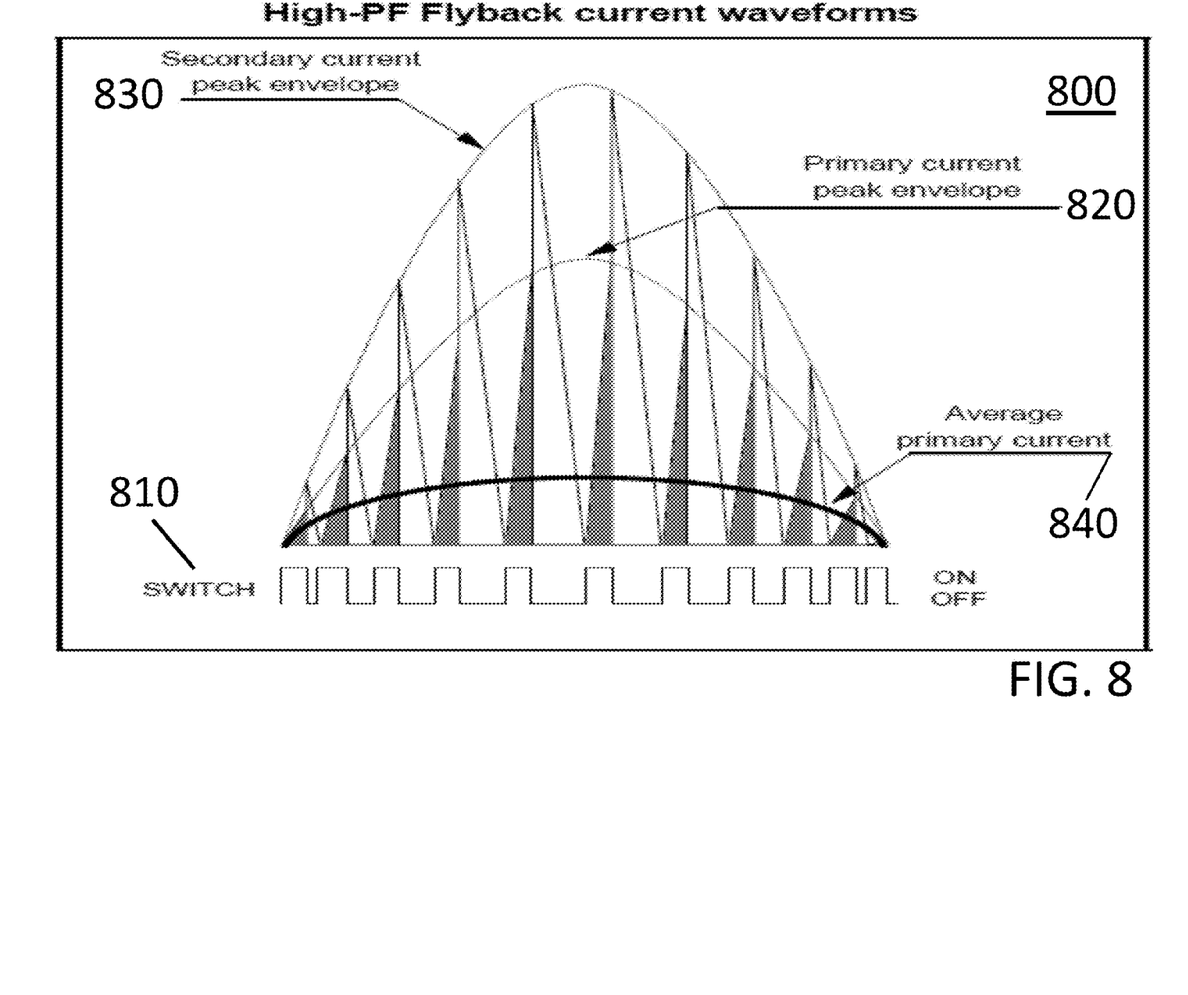
FIG. 8 is a graph illustrating the current waveform generated by the LED driver of FIG. 7.

As shown in FIG. 8, the input current wave shape 800 can be partially cured by "cheating" the input multiplier and feeding it with a counter 810—flat signal, a pre-distorted sinusoidal input—that will force the flyback converter to draw more current at the peak, where it is normally flat. For instance, a useful such distortion can be Vsense=K*Vin where n>1 (where n=1 represents the conventional case with a simple voltage divider). Still referring to FIG. 8, the primary current peak envelope is represented by waveform 820 and the secondary current peak envelope is represented by waveform 830. This results in an average primary current 840, as shown.

Figure 9:
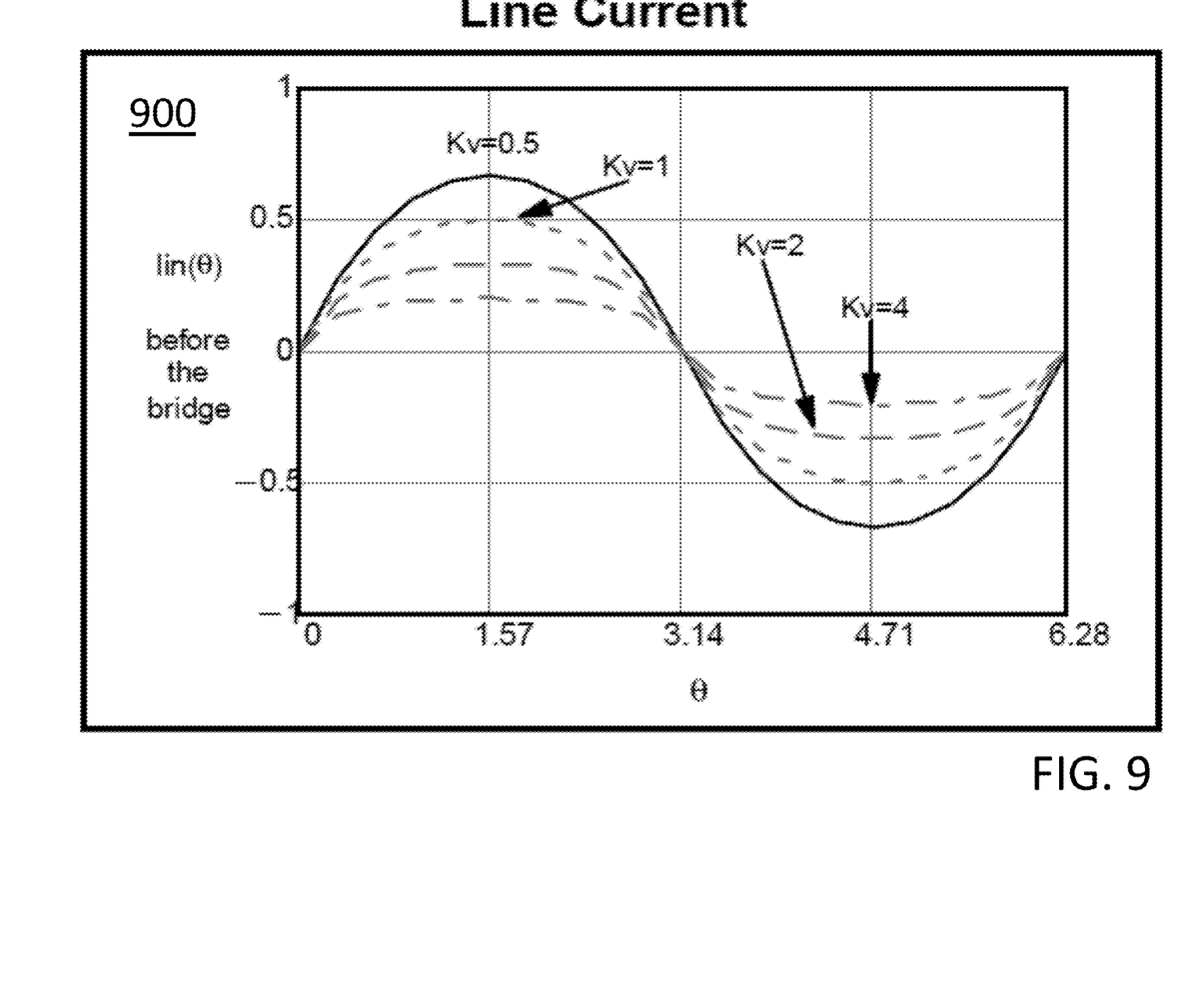
FIG. 9 is a graph of the line current generated by the LED driver of FIG. 7 with varying values of Kv.

The impact of the value of $K_v$ on the line current is illustrated in the graph 900 of FIG. 9. Specifically, different line current waveforms are illustrated based on the value of $K_v$. Specifically, different line current waveforms are illustrated for the following values of $K_v$, where $K_v=0.5$, $K_v=1$, $K_v=2$, and $K_v=4$.

Figure 10:
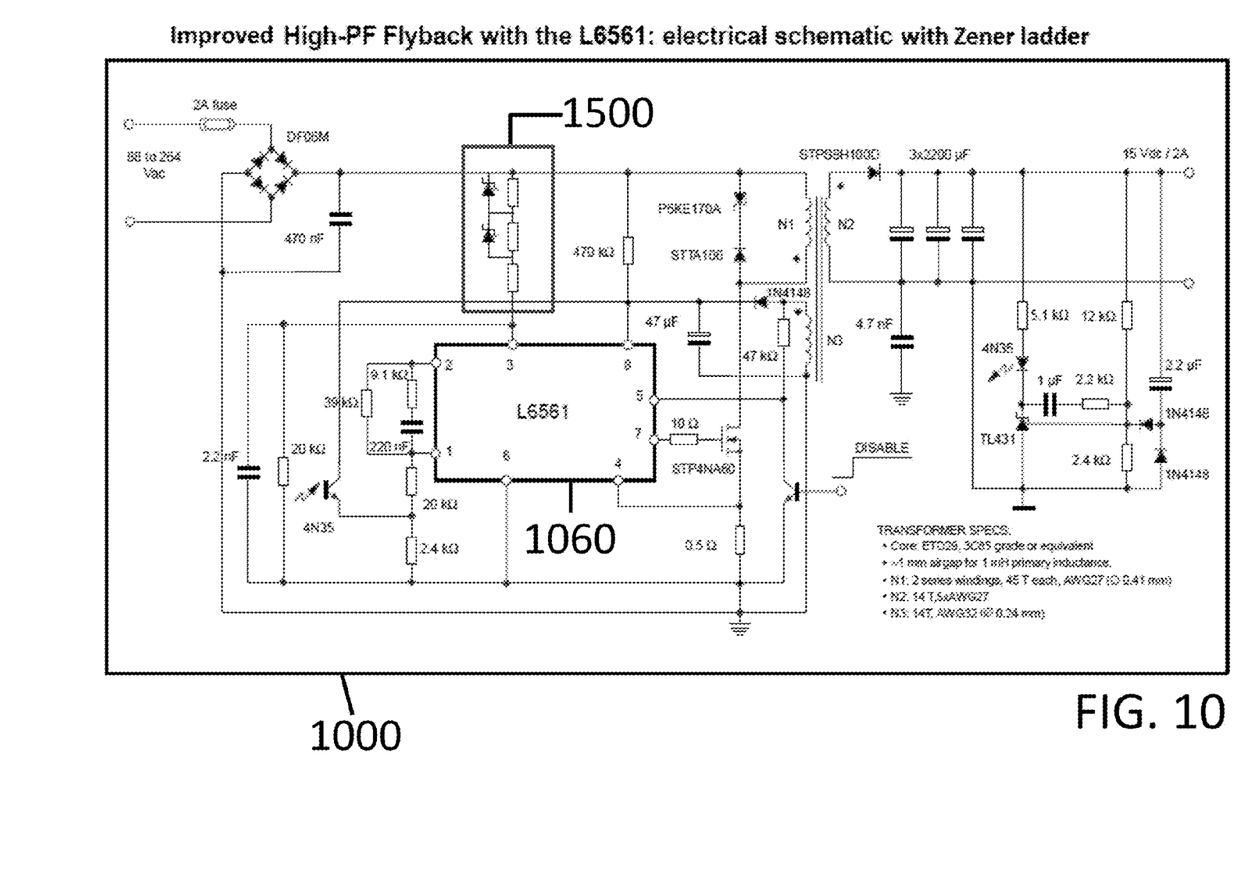
FIG. 10 illustrates an electrical schematic of an improved, high power flyback, single-stage LED driver having an exemplary, passive voltage multiplier circuit constructed in accordance with embodiments of the present invention.

In one embodiment, an improved single stage flyback LED driver 1000, in which the THD of the converter is improved over a conventional single stage flyback LED driver, is illustrated in FIG. 10. The improved single stage flyback LED driver 1000 has a high power factor and uses a conventional PFC controller 1060, such as the L6561 (or an L6562 or a UCC28810). However, instead of just having a simple resistor leading into the sensed, rectified line voltage input or pin of the PFC controller 1060, the improved single stage flyback LED driver 1000 includes a two Zener ladder 1500. Use of the Zener ladder 1500 improves the THD of the input AC current drawn by the single stage flyback converter.

By way of example, with a Pout of 33 W and a Vin of 230 VAC, the conventional single-stage flyback LED driver 700 from FIG. 7 results in a THD of approximately 18%. In contrast, by using the Zener ladder 1500, with the same Pout of 33 W and the same Vin of 230 VAC, the improved single-stage flyback LED driver 1000 from FIG. 10 results in an improved THD of approximately 7%.

Figure 11:
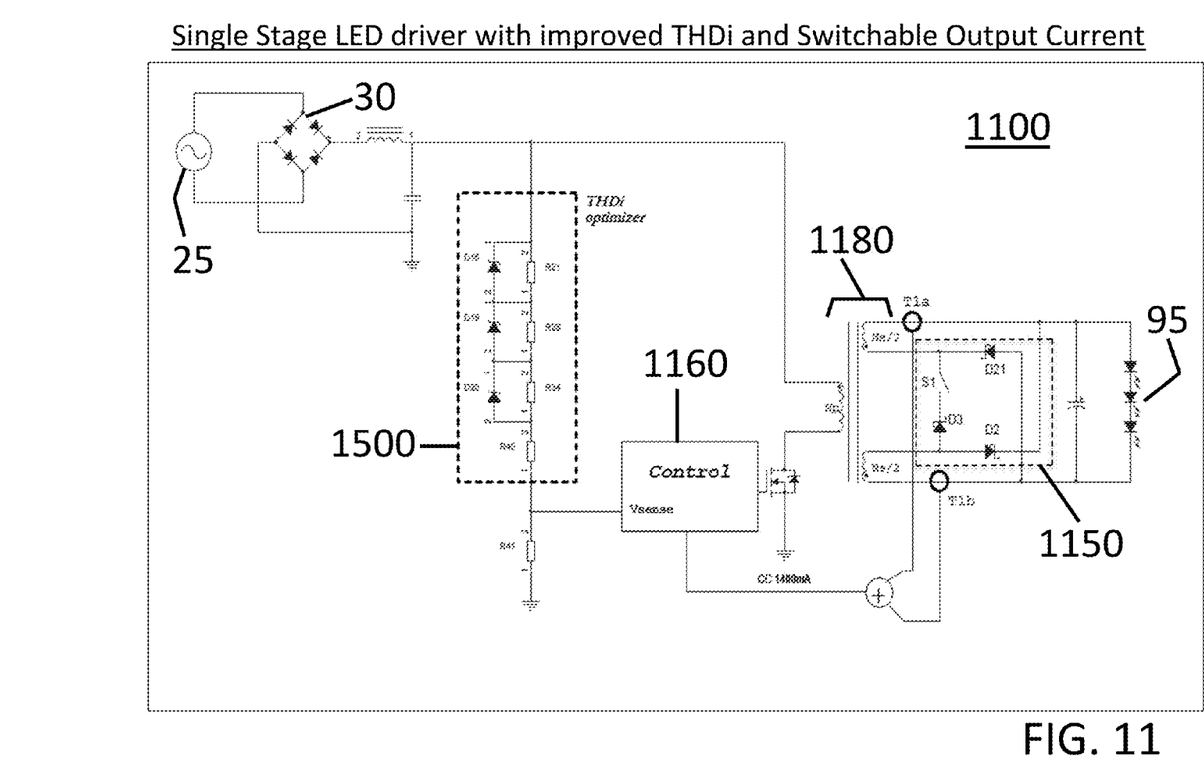
FIG. 11 illustrates an electrical schematic in block diagram format of an improved, high power flyback, single-stage LED driver having both an exemplary, passive voltage multiplier circuit and an output current splitter switch circuit constructed in accordance with embodiments of the present invention.

As stated previously, it is possible (i) to improve the THD or (ii) to provide for a switchable output current or (iii) to combine both improvements in a single stage flyback converter or single stage flyback LED driver. A single stage flyback LED driver 1100, with the combination of an improved THD and with a switchable output current, is illustrated in FIG. 11. For simplicity and ease of understanding, non-relevant components (which are shown in more detail in FIGS. 7 and 10) are not included in the schematic illustrated in FIG. 11.

The single stage flyback LED driver 1100 receives AC voltage and current from the AC power supply 25, which runs first through the bridge rectifier 30 and usually through high frequency input filter (not shown). A Zener diode ladder 1500 or voltage multiplier circuit multiplies the voltage sensed by the conventional PFC controller 1160, in a manner as previously described with reference to the flyback converter from FIG. 10. Use of the voltage multiplier to modify the input of the sensed voltage input or pin of the PFC controller 1160 improves the THD of the flyback converter, as previously discussed.

The single stage flyback LED driver 1100 further includes a flyback transformer 1180. As with the schematic of the dual-current, low voltage flyback converter 600 from FIG. 6, the flyback transformer 1180 is configured such that its primary windings are designed in conventional fashion; however, the secondary windings are preferably split into two identical halves (bifilar windings). A switch circuit 1150, which includes a switch 51 and three fast Schottky diodes D1, D2, and D3, is placed across the output of the flyback transformer 1180, such that the secondary windings are configured either to be in series or in parallel with each other—based on the position and status of the switch circuit 1150.

More specifically, when the switch S1 is closed, the fast Schottky diodes D1, D2 are in their OFF state, but the fast Schottky diode D3 is in its ON state, which causes the secondary windings to be in a series configuration. Conversely, when the switch S1 is open, the fast Schottky diodes D1, D2 are in their ON state, and the fast Schottky diode D3 is in its OFF state, which causes the secondary windings to be in a parallel configuration.

Thus, when the secondary windings are in series, the output current of the single stage flyback LED driver 1100 will be set to a value of "I" to the load 95. When the secondary windings are in parallel, the output current of the single stage flyback LED driver 1100 will be doubled (2*I) to the load 95.

Thus, by way of example only, if current "I" is set to 700 mA, such current is provided to the LED load 95 when the switch circuit 1150 is closed. However, when the switch circuit 1150 is opened, the current provided to the LED load 95 is equal to 2*I, or 1400 mA, in this example.

In addition, no modifications need to be made to the controller 1160 to achieve the desired output current. As will be appreciated by those of skill in the art, the specific output current "I" (and 2*I) can be determined, in advance, by the circuit designer based on the winding ratios between the primary windings and the secondary windings of the flyback transformer 1180 and by the control current (2*I) established by the PFC controller 1160.

In contrast with output capacitor used with the dual stage flyback converter 600 from FIG. 6, the single stage flyback LED driver 1100 requires that the output capacitor (across the load 95) be larger than is required when the PFC converter is designed as a two stage converter. For example, in the single stage flyback LED driver 1100 of FIG. 11, a capacitor having a capacitance between 1000 and 4700 uF would typically be necessary.

CONCLUSION

As noted above, embodiments of the present invention provide an improved two-stage LED driver for powering an LED load. In some embodiments, an improved first stage of an LED driver includes a buck topology PFC circuit that uses a low cost PFC controller that typically has a poor input THD. By squaring the rectified sensed input voltage provided to the PFC controller, preferably using a low cost, passive circuit, the THD of the AC input current drawn by the LED driver is significantly improved, while maintaining the efficiency of the buck PFC circuit, but also without significantly increasing the overall cost of the LED driver.

In some embodiments, an improved second stage of an LED driver includes a low voltage flyback circuit. By splitting the secondary windings of the flyback transformer used in the low voltage flyback circuit into two sections and by adding a switch circuit between the two sections, it is possible to toggle the DC output current provided to the LED load between two different values.

The improved first and second stages of the LED driver can be used in conjunction with each other or can be used independently of each other within an LED driver.

Further, although the improved buck PFC circuit, the passive voltage squaring circuit, and the dual-output low voltage flyback circuit are designed and explained in conjunction with their use in an LED driver, it will be appreciated by those of skill in the art that each independent circuit design and teaching has broad utility and can be used in a wide range of power supplies, power converters, driver circuits, and for providing power to a wide variety of loads, other than just an LED load.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

For example, various aspects of the present invention can be implemented by software, firmware, hardware (or hardware represented by software such as, for example, Verilog or hardware description language instructions), or a combination thereof. After reading this description, it will become apparent to a person skilled in the relevant art how to implement the invention using other computer systems and/or computer architectures.

It is to be appreciated that the Detailed Description section, and not the Summary and Abstract sections, is intended to be used to interpret the claims. The Summary and Abstract sections may set forth one or more, but not all, exemplary embodiments of the present invention as contemplated by the inventor(s), and thus, are not intended to limit the present invention and the appended claims in any way.

What is claimed is:

1. An AC-DC power converter for powering a load at a substantially constant current, comprising:
   a power factor correction (PFC) circuit, the PFC circuit connected to an alternating current (AC) power supply and configured to output a direct current (DC) voltage and a DC current; and
   a low voltage flyback circuit, the low voltage flyback circuit receiving the DC voltage and the DC current output by the PFC circuit,
   wherein the low voltage flyback circuit includes a flyback transformer and a switch circuit that selectably toggles the substantially constant output current provided by the low voltage flyback circuit to the load between a first, preset constant current and a second, preset constant current.

2. The AC-DC power converter of claim 1, wherein the flyback transformer comprises a primary winding and a secondary winding, the secondary winding being split into two sections.

3. The AC-DC power converter of claim 2, wherein the two sections of the secondary winding are split into equal halves.

4. The AC-DC power converter of claim 2, wherein the two sections of the secondary winding are bifilar windings.

5. The AC-DC power converter of claim 2, wherein the switch circuit toggles between a first configuration in which the two sections of the secondary winding are in series and a second configuration in which the two sections of the secondary winding are in parallel.

6. The AC-DC power converter of claim 5, wherein, when the two sections of the secondary winding are in series, the low voltage flyback circuit provides the first, preset constant current to the load.

7. The AC-DC power converter of claim 5, wherein, when the two sections of the secondary winding are in parallel, the low voltage flyback circuit provides the second, preset constant current to the load.

8. The AC-DC power converter of claim 1, wherein the first, preset constant current is half the amperage of the second, preset constant current.

9. The AC-DC power converter of claim 1, wherein the switch circuit includes a switch and three, fast Schottky diodes.

10. The AC-DC power converter of claim 9, wherein, when the switch is in a closed position, the two sections of the secondary winding are in series with each other.

11. The AC-DC power converter of claim 9, wherein, when the switch is in an open position, the two sections of the secondary winding are in parallel with each other.

12. The AC-DC power converter of claim 1, wherein the low voltage flyback circuit further comprises a controller and wherein the controller sets the second, preset constant current.

13. The AC-DC power converter of claim 1, wherein the AC-DC power converter includes two stages, and wherein the PFC circuit is the first stage of the AC-DC power converter and the low voltage flyback circuit is the second stage of the AC-DC power converter.

14. A method for powering a load at a substantially constant current using a two stage AC-DC power converter, comprising:
receiving an alternating current (AC) voltage from an AC power supply;
converting the AC voltage into a direct current (DC) voltage and a DC current;
providing the DC voltage and the DC current to a low voltage flyback circuit, the low voltage flyback circuit including a flyback transformer and a switch circuit; and
using the switch circuit, setting the output current provided to the load at either a first, preset constant current or a second, preset constant current.

15. The method of claim 14, wherein the flyback transformer comprises a primary winding and a secondary winding, further comprising splitting the secondary winding into two equal halves, wherein the step of setting the output current provided to the load at either the first, preset constant current or the second, preset constant current further comprises toggling the switch circuit between a first configuration in which the two sections of the secondary winding are in series and a second configuration in which the two sections of the secondary winding are in parallel, wherein the step of configuring the two sections of the secondary winding in series further comprises providing the first, preset constant current to the load, and wherein the step of configuring the two sections of the secondary winding in parallel further comprises providing the second, preset constant current to the load.

16. The method of claim 15, wherein the switch circuit includes a switch and three, fast Schottky diodes, wherein closing the switch causes the low voltage flyback circuit to be in the first configuration in which the two sections of the secondary winding are in series and wherein opening the switch causes the low voltage flyback circuit to be in the second configuration in which the two sections of the secondary winding are in parallel.

17. A system for powering a load at a substantially constant current, comprising:
an alternating current (AC) power supply that provides an AC input voltage and an AC input current;
a first stage of a two stage LED driver, the first stage including a power factor correction (PFC) circuit connected to the AC power supply and configured to output a direct current (DC) voltage and a DC current; and
a second stage of the two stage LED driver, the second stage including a low voltage flyback circuit;
wherein the low voltage flyback circuit receives the DC voltage and the DC current output by the PFC circuit, and
wherein the low voltage flyback circuit includes a flyback transformer and a switch circuit that selectably toggles the substantially constant output current provided by the low voltage flyback circuit to the load between a first, preset constant current and a second, preset constant current.

18. The system of claim 17, wherein the flyback transformer comprises a primary winding and a secondary winding, the secondary winding being split into two equal halves, wherein the switch circuit toggles between a first configuration in which the two sections of the secondary winding are in series and a second configuration in which the two sections of the secondary winding are in parallel, and wherein, when the two sections of the secondary winding are in series, the low voltage flyback circuit provides the first, preset constant current to the load and, when the two sections of the secondary winding are in parallel, the low voltage flyback circuit provides the second, preset constant current to the load.

19. The system of claim 17, wherein the first, preset constant current is half the amperage of the second, preset constant current, wherein the low voltage flyback circuit further comprises a controller, and wherein the controller sets the second, preset constant current.

20. The system of claim 17, wherein the switch circuit includes a switch and three, fast Schottky diodes and wherein, when the switch is in a closed position, the two sections of the secondary winding are in series with each other and, when the switch is in an open position, the two sections of the secondary winding are in parallel with each other.

* * * * *